United States Patent [19]

Lindmayer et al.

[11] Patent Number: 5,666,873

[45] Date of Patent: Sep. 16, 1997

[54] SWITCH ACTUATABLE OPERATING SYSTEM FOR FOLDING TOP HYDRAULIC DRIVE ELEMENTS

[75] Inventors: Martin Lindmayer, Sulz; Juergen Schrader, Weil im Schoenbuch; Frank van de Poel, Boeblingen, all of Germany

[73] Assignee: Mercedes-Benz AG, Germany

[21] Appl. No.: 400,889

[22] Filed: Mar. 8, 1995

[30] Foreign Application Priority Data

Mar. 8, 1994 [DE] Germany .......................... 44 07 739.4

[51] Int. Cl.$^6$ ................................................ F15B 11/00
[52] U.S. Cl. ............................................. 91/511; 296/117
[58] Field of Search .................... 91/178, 165, 519, 91/534, 536, 417 R, 511; 296/107, 117; 60/477

[56] References Cited

U.S. PATENT DOCUMENTS

| | | | |
|---|---|---|---|
| 3,312,058 | 4/1967 | Shelhart | 296/117 X |
| 3,945,206 | 3/1976 | Krause | 91/47 X |
| 4,161,135 | 7/1979 | Garlinghouse | 91/417 R |
| 4,485,725 | 12/1984 | Tootle | 91/417 R X |
| 5,253,575 | 10/1993 | Claar et al. | 296/117 X |

FOREIGN PATENT DOCUMENTS

| | | | |
|---|---|---|---|
| 3826789 | 2/1990 | Germany | 296/117 |
| 2-127125 | 5/1990 | Japan . | |
| 4-56628 | 2/1992 | Japan . | |

Primary Examiner—Hoang Nguyen
Attorney, Agent, or Firm—Evenson, McKeown, Edwards & Lenahan, P.L.L.C.

[57] ABSTRACT

An operating system for hydraulic drive elements of a folding top, such as a lowerable folding top of a convertible, can be actuated by switching apparatus. The drive elements are fed by a pressure source from a pressure medium reservoir via an inlet and connected to a return to the pressure medium reservoir. Switchable directional control valves distribute the pressure generated by the pressure source to the drive elements moving various parts. Actuation of the directional control valves corresponds to a given sequence of movements of the top. To simplify the operating system, a plurality of operational elements assigned to various operating functions can be switched at the same time by individual directional control valves. As a result, a smaller number of expensive directional control valves is required.

10 Claims, 2 Drawing Sheets

SWITCH ACTUATABLE OPERATING SYSTEM FOR FOLDING TOP HYDRAULIC DRIVE ELEMENTS

BACKGROUND AND SUMMARY OF THE INVENTION

The present invention relates to an operating system for hydraulic drive elements of a folding top, in particular of a lowerable folding top of a convertible, which can be actuated by switching apparatus, and, more particularly, to an operating system having drive elements feedable by a pressure source from a pressure medium reservoir via an inlet and connectable to a return to the pressure medium reservoir, switchable directional control valves for distributing pressure generated by the pressure source to the drive elements for moving various parts of the convertible folding top system and having an actuation of the directional control valves corresponding to a given sequence of movements thereof, limit switches for actuating the directional control valves, the limit switches being positively operated by driven parts, and a plurality of driven parts in the form of closures which can be locked and unlocked by double-acting working cylinders and mechanically arrested in a release position thereof against locking by an associated working cylinder.

An electrohydraulic operating system is described in DE 38 26 789 A1. Although the known operating system has a high functional reliability, it is also technically relatively costly. One factor in particular driving up the costs is that a relatively large number of expensive directional control valves are required in the system.

An object of the present invention is to improve operating systems such that a less costly operating system is possible without sacrificing functional reliability.

The foregoing object has been achieved according to the present invention by providing that the pressure source has a feed line arranged to be constantly flow-connected via inlet lines to a rod side of the working cylinders interacting with the closures, as a result of which a pressurization of the pressure medium in the feed line results in an impingement of the working cylinders in a locking advancement direction thereof, and the working cylinders are configured to be differentially actuatable by assigned ones of the directional control valves, by activation of which a drive element of another driven part is switchable along therewith.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1A:
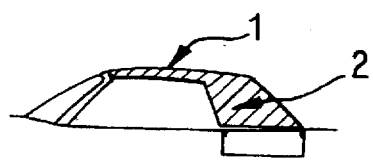
FIG. 1 are schematic plan views (a) through (j) of the given sequence of movements of a roadster folding top on a partially shown vehicle in various phases of the opening operation.

The sequence of movements of the folding top 1 illustrated in FIG. 1 is described in brief below in (a)–(j) by key words and refers to views (a)–(j) of FIG. 1, respectively:

(a) a folding top designated generally by numeral 1 is closed, hydraulic system is pressureless, all the closures are locked;

(b) a fabric-holding hoop on the rear folding-top part 2 is unlocked;

(c) the fabric-holding hoop on the rear folding-top part 2 is swivelled-up;

(d) a folding-top compartment lid 3 is unlocked;

(e) the folding-top compartment lid 3 is swung-up to expose an opening of a folding-top compartment 4;

(f) front closures on the frame above the windscreen are unlocked;

(g) the folding top 1 is opened and laid down with the rear folding-top part 2, folded one over the other, in the folding-top compartment 4;

(h) the folding-top compartment lid 3 is swung-down;

(i) the folding-top compartment lid 3 is locked; and (j) the folding top 1 is completely open, and the hydraulic system is pressureless again.

During closing of the folding top 1, these movements occur in the reverse sequence from that described above.

Figure 2:
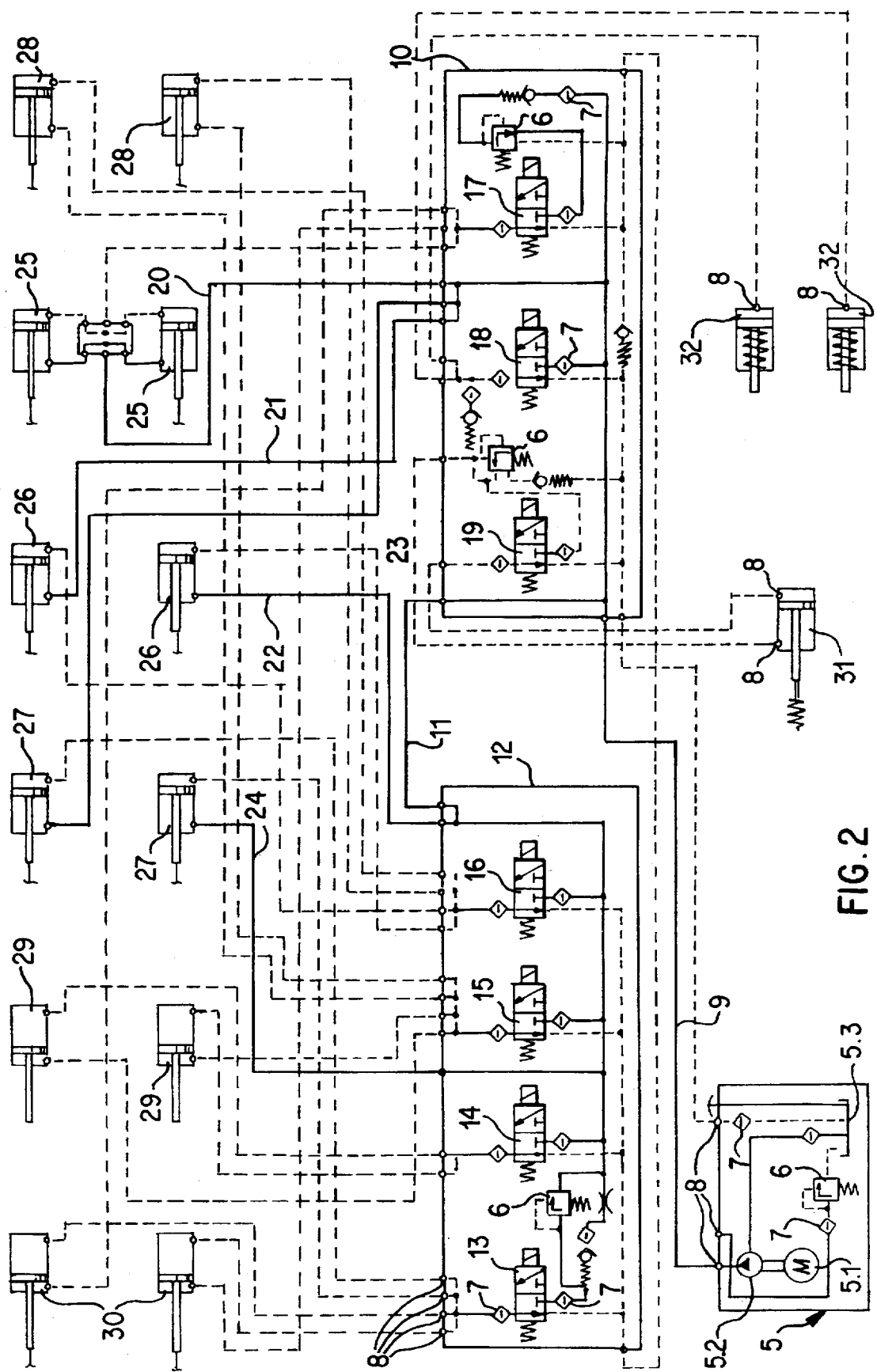
FIG. 2 is a circuit diagram for the hydraulic network for operating the top and for operating a rollover bar in accordance with the present invention.

The operating sequence of the folding top 1, of the rear folding-top part 2, of the folding-top compartment lid 3 and of the respectively assigned closures is controlled by a known type of central electronic control device which receives its input signals, determining the position at any one moment of the parts to be driven, essentially by the positive operating of limit switches. Depending on the directional preselection at an operating switch, configured as a shift key, for opening and closing the top 1, the valve operating functions required for a coordinated sequence of movements of the parts to be driven are actuated in the hydraulic system shown in FIG. 2 by output signals of the control device. For reasons of overall clarity, representation of the electrical control lines has been dispensed with in the drawing.

The line system is supplied centrally from a hydraulic unit designated generally by the numeral 5 and comprises a pump 5.2, to be driven by an electric motor 5.1, a pressure-medium sump 5.3 with venting, a pressure-control valve 6 and also a plurality of pressure-medium filters 7. In addition, a plurality of test connections 8 are arranged on the hydraulic unit 5. Other pressure-control valves 6, pressure-medium filters 7 and test connections 8 are additionally located at all relevant points of the line network, as marked by the drawn-in symbols in FIG. 2. The pressure medium delivered by the hydraulic unit 5 is fed through a feed line 9 initially into a right-hand valve block 10 of the system. This feeding takes place directly, i.e., as distinct from the known system, without interconnection of a directional valve, as soon as the pump 5.2 has built up an adequate delivery pressure. The feed line 9 in the valve block 10 is flow-connected by an overflow line 11 to a corresponding feed line in a left-hand valve block 12.

The feed line 9 in the left-hand valve block 12 supplies four electromagnetically switchable 2/3-way valves 13, 14, 15 and 16 with the pressure medium. The feed line 9 in the right-hand valve block 10 is used for directly supplying two and indirectly supplying three identical directional control valves 17, 18 and 19. Only the directional control valve 17 serves to operate the folding top. By contrast, the directional control valves 18, 19 operate a rollover bar which can be moved by swivelling between a lowered rest position and an erected protecting position.

Furthermore, the feed line 9 is flow-connected directly, i.e. without interconnection of a directional control valve, via inlet lines 20, 21, 22, 23 and 24 to the rod side of assigned hydraulic cylinders 25, 26 and 27, respectively, which are in each case arranged in pairs.

The two hydraulic cylinders 25 drive front folding-top closures of the top 1 direction-reversibly between the locking position and the unlocking position, by which the roof cap can be locked above the windscreen. The two hydraulic cylinders 26 are used to drive two middle closures, by which the folding-top compartment lid 3 can be locked to the vehicle body. Finally, the two hydraulic cylinders 27 effect the rotary drive output of two rear folding-top closures, by which the fabric-holding hood of the rear folding-top part 2 can be locked on the closed folding-top compartment lid 3.

All the pivoted-latch closures driven by the hydraulic cylinders 25, 26 and 27 have a known design as described in DE 37 08 095 C2, and therefore need not be described further so as not to obscure the essential features of the present invention such as the pivoted-latch closures which are held in their release position and lockable by the assigned working cylinder only after the forked pivoted latch has been turned through an unlocking rotation angle by the entering closure pin.

Furthermore, there are two hydraulic cylinders 28 for the swivelling drive of the folding-top compartment lid 3. The inlet of these cylinders 28 is respectively controlled on the rod side by the directional control valve 15 and on the solid piston side by the directional control valve The inlet lines to two hydraulic cylinders 29, which are connected by their rod side, are enabled by the directional control valve 15, whereas the inlet lines to the solid piston side of the hydraulic cylinders 26 are enabled by the directional control valve 16. The hydraulic cylinders 29 serve for the swivelling drive of the fabric-holding hoop belonging to the rear folding-top part 2.

Two hydraulic cylinders 30 are provided for the main swivelling drive of the top 1 and are articulated on the lateral pillars of the top 1. These cylinders 30 are actuated on their solid piston side by the directional control valve 13, with the inlet to the solid piston side of the hydraulic cylinders 27 being enabled. Finally, the inlets to the piston rod sides of the hydraulic cylinders 30 and to the solid piston sides of the hydraulic cylinders 25 are enabled by the directional control valve 17.

Figure 1B:
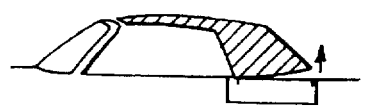

During opening of the top, the following sequence is obtained on account of the simplified system:

(i) By switch actuation, the pump 5.2 of the hydraulic unit 5 becomes operational and builds up the working pressure. As a result, the rod sides of the cylinders 25, 26 and 27 are pressurized. This pressure increase does not have any further effect, since the assigned closures remain in their locked end position and are only pressed slightly further in the locking direction. Directional control valve 13 is activated so that the solid piston sides of the cylinders 30 are pressed in the pushing-out direction of the piston (synonymous with the folding top closed position). In parallel with the foregoing operation, the rear folding-top closures are unlocked by the differential impingement of the cylinders 27 (FIG. 1b)

Figure 1C:
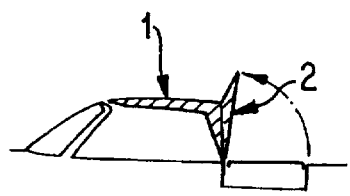

(ii) In addition, directional control valve 15 is switched. Consequently, the pressure medium acts on the rod side of the cylinders 29, resulting in the pistons being pushed in to swing up the fabric-holding hoop (FIG. 1c). At the same time, the rod side of the cylinders 28 is pressurized, resulting in the closed lid being pressed in the closed direction.

Figure 1D:
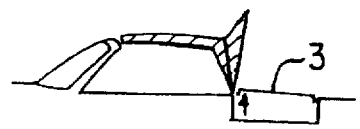
Figure 1E:
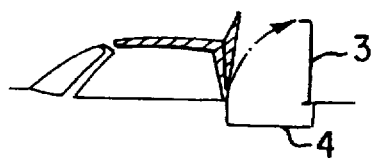

(iii) Directional control valve 16 is also cut in. As a result, the supply lines to the solid piston side of the cylinders 26 are enabled, as a result of which their pistons are differentially pushed out and the middle closures are opened (FIG. 1d). At the same time, the inlet lines to the solid piston side of the cylinders 28 are opened, as a result of which the pistons of the cylinders 28 are differentially pushed out and thereby swing up the folding-top compartment lid 3 (FIG. 1e).

Figure 1F:
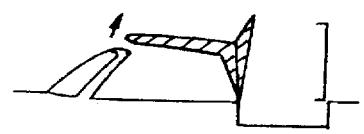

(iv) Then, directional control valve 17 is also switched off. As a result, the pressure medium column on the solid piston side of the cylinders 25 then becomes effective which causes the differential advancement of the pistons. The front folding-top closures are thereby unlocked (FIG. 1f). At the same time, the inlet lines to the piston rod side of the cylinders 30 are enabled, so that the actuation of the top 1 in the closed direction is differentially maintained. This results in an easy-action unlocking of the tension-relieved front closures.

Figure 1G:

(v) Directional control valve 13 is closed. As a result, the pistons of the cylinders 30 are retracted, and the top 1 is swung back into the folding-top compartment 4 (FIG. 1g).

Figure 1H:
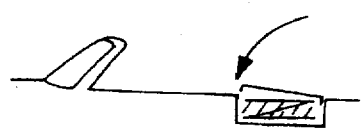
Figure 1I:

(vi) Directional control valve 16 is then closed. As a result, the cylinders 26 of the middle closures are impinged in the pushing-in direction of the pistons, i.e. in the locking direction. Because of the mechanical arrest of the closures, however, the closures remain blocked. At the same time, the pressure medium column on the solid piston side of the cylinders 28 is enabled, so that the pistons are pushed in and swing the lid 3 closed (FIG. 1h). If the pivoted latch of the middle closures is released by the striking closure pins, the piston impingement on the rod side of the cylinders 26 becomes effective and locks the folding-top compartment lid 3 (FIG. 1i) by the middle closures.

Figure 1J:

(vii) Thereafter, all the directional control valves 13, 14, 15, 16 and 17 are switched off and the hydraulic unit 5 is disconnected, because the top 1 is open (FIG. 1j).

During closing of the opened top 1, the following sequence of movements is obtained:

(i) By operating switches in the closing direction, the hydraulic unit 5 is switched on and builds up the required working pressure. By switching on the directional control valve 16, the cylinders 26 are differentially impinged, as a result of which the middle closures are unlocked. At the same time, the cylinders 28 are pressurized on the solid piston side and swing the folding-top compartment lid 3 up into its open position.

(ii) Directional control valves 13 and 15 are cut in. The top 1 is increasingly closed by impingement of the cylinders 30. The closures which can be operated by the cylinders 27 are differentially impinged in the unlocking direction. On the rod side of the cylinders 29, the pressure medium pressure acts and holds the fabric-holding hoop in its raised position. At the same time, the supply line to the rod side of the cylinders 28 for the lid 3 is released. The directional control valve 17 is cut in time-dependently by the control electronics which allow the use of one less limit switch. This cutting-in must take place before the closure pins of the top 1 interact with the front closures, because the inlet lines to the rod side of the working cylinders 30 are enabled by directional control valve 17 and consequently effect differential working thereof. This ensures that the top 1 does not hit the roof frame too hard. In addition, the inlet lines to the solid piston sides of the cylinders 25 are enabled by directional control valve 17, as a result of which the differentially extended pistons unlock their assigned closure. With the striking of the closure pins against the front folding-top closures, directional control valve 17 is switched off. Consequently, the cylinders 25 are pushed out, impinged by the pressure medium column of the inlet line 20, and effect a locking of the front closures.

(ii) Then, directional control valve 16 is switched off. As a result, the cylinders 28 are pushed in and swing the lid 3 closed. At the same time, the pressurization of the solid piston side of the cylinders 26 is discontinued, as a result of which the pistons of the latter are pushed in, after lifting the mechanical blocking, by the pressure medium columns of the inlet lines 21, 22, respectively, and a locking of the middle closures is thereby brought about.

(iv) Directional control valve 14 is opened, and directional control valve 15 is closed. As a result, the cylinders 29 are impinged in a pushing-out manner and swing the fabric-holding hoop down into its resting position. At the same time, the top 1 is actuated further in the closing direction and the cylinders 27 in the unlocking direction of their closures.

(v) On reaching the limit switch signalling the unlocked end position of the fabric-holding hoop, directional control valve 13 is also switched off. As a result, the pistons of the cylinders 27, impinged with pressure medium via the supply lines 23 and 24, retract and thereby turn the closures of the fabric-holding hoop into the closed end position.

(vi) Finally, the hydraulic unit 5 is disconnected and all the directional control valves are enabled, after which the top 1 is closed.

The operating system which has been thus greatly simplified according to the present invention allows altogether four less directional control valves to be used, by various operating functions being actuated in parallel as above described. The return lines, not mentioned so far, from the two valve blocks 10, 12 to the hydraulic unit 5 are indicated by short dashed lines.

On account of the space saving achieved by requiring with less valves, it is now readily possible for the first time also to integrate the two directional control valves 18, 19 for a rollover bar of known construction into the right-hand valve block 10 and feed valves 18, 19 through the joint feed line 9. As a result, the line network as a whole can now be made more compact. This rollover bar is spring-loaded in the erecting direction and can be moved for curved operation by a hydraulic cylinder 31. The operation of the rollover bar aimed for by actuating the directional control valve 19 is possible by looping into the circuit of the directional control valve 18 only if the latter is likewise enabled, as a result of which two hydraulic cylinders 32 unlock, against a spring loading, an arresting mechanism which unsecures the rollover bar.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An operating system for hydraulic drive elements of a convertible folding top system actuatable by switching devices, comprising drive elements feedable by a pressure source from a pressure medium reservoir via an inlet and connectable to a return to the pressure medium reservoir, switchable directional control valves for distributing pressure generated by the pressure source to the drive elements for moving various parts of the convertible folding top system and having an actuation of the directional control valves corresponding to a given sequence of movements thereof, limit switches configured for actuating the directional control valves, and being positively operated by driven parts, and a plurality of driven parts comprising closures adapted to be locked and unlocked by double-acting working cylinders and mechanically arrested in a release position thereof against locking by an associated working cylinder, wherein the pressure source has a feed line arranged to be constantly flow-connected via inlet lines to a rod side of the working cylinders interacting with the closures, as a result of which a pressurization of the pressure medium in the feed line results in an impingement of the working cylinders in a locking advancement direction thereof, and the working cylinders are configured to be differentially actuatable by assigned ones of the directional control valves so as to switch a drive element of another driven part.

2. The operating system according to claim 1, wherein the pressure source comprises a hydraulic unit having a delivery pressure constantly coinciding approximately with a pressure of the pressure medium in the feed line.

3. The operating system according to claim 1, wherein two front, middle and rear closures are configured to be operable by associated synchronously working pairs of working cylinders for the locking and unlocking of the parts.

4. The operating system according to claim 3, wherein the pair of working cylinders of the front closures and rod sides of a pair of double-acting working cylinders for a main swivelling drive of the top are configured to be switchable by a joint directional control valve.

5. The operating system according to claim 3, wherein the pair of working cylinders of the middle closures and piston head sides of two double-acting working cylinders for a swinging drive of a folding-top compartment lid are configured to be switchable by a joint directional control valve.

6. The operating system according to claim 3, wherein the pair of working cylinders of the associated rear closures and piston head sides of a double-acting working cylinders for a main swivelling drive of the top are configured to be switchable by joint directional control valve.

7. The operating system according to claim 3, wherein the rod sides of two double-acting working cylinders for swivelling drive of a fabric-holding hoop of the top and rod sides of the working cylinders for a swinging drive of the folding-top compartment lid are configured to be switchable by a joint directional control valve.

8. The operating system according to claim 1, wherein the feed line of the pressure source is arranged to open out into an inlet of a line system for operating a rollover bar.

9. The operating system according to claim 8, wherein the line system for operating the rollover bar is integrated into the line system for operating the top.

10. The operating system according to claim 9, wherein directional control valves for operating the rollover bar is arranged in a valve block of the top.

* * * * *